Figure 1:
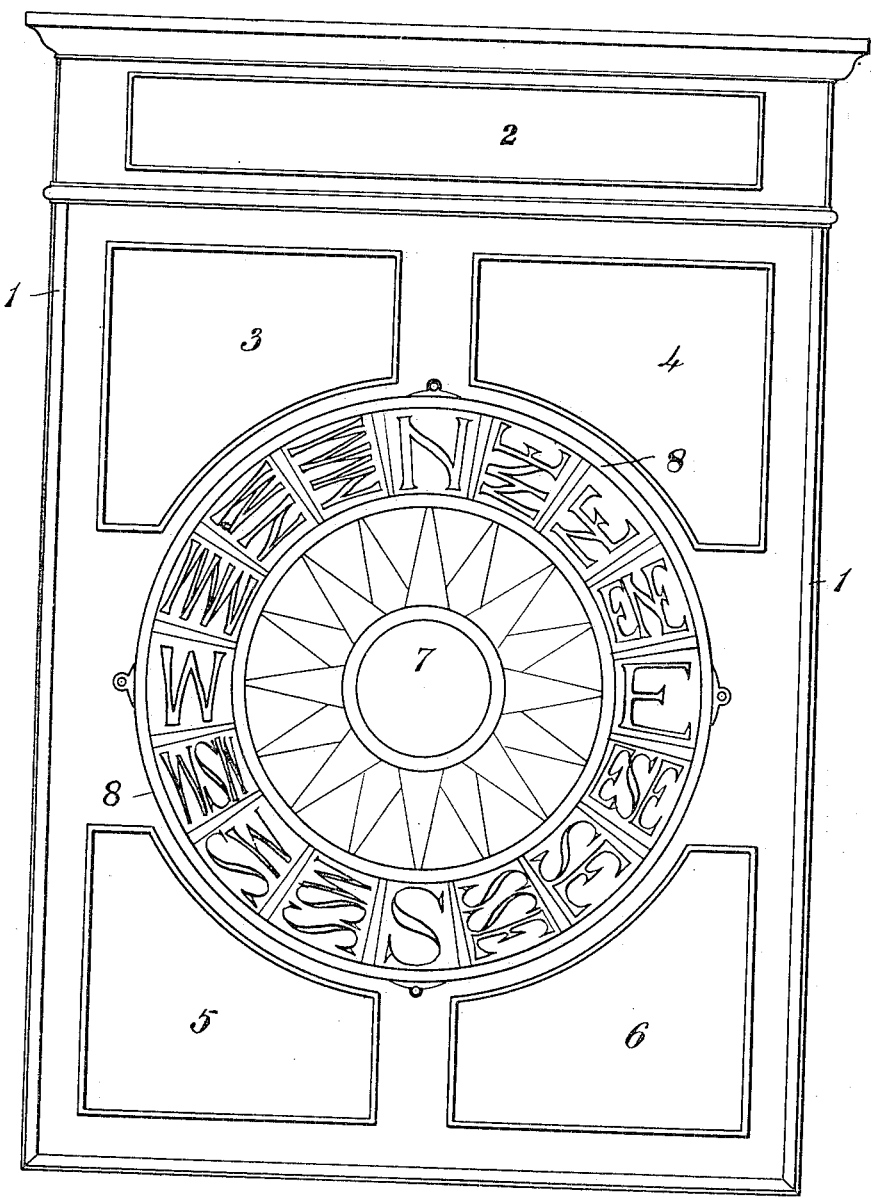

G. T. RICHARDSON.
APPARATUS FOR INDICATING THE DIRECTION OF THE WIND.
APPLICATION FILED DEC. 15, 1911.

1,117,907.

Patented Nov. 17, 1914.

4 SHEETS—SHEET 1.

Witnesses

Inventor
George Thomas Richardson
per
Attorney

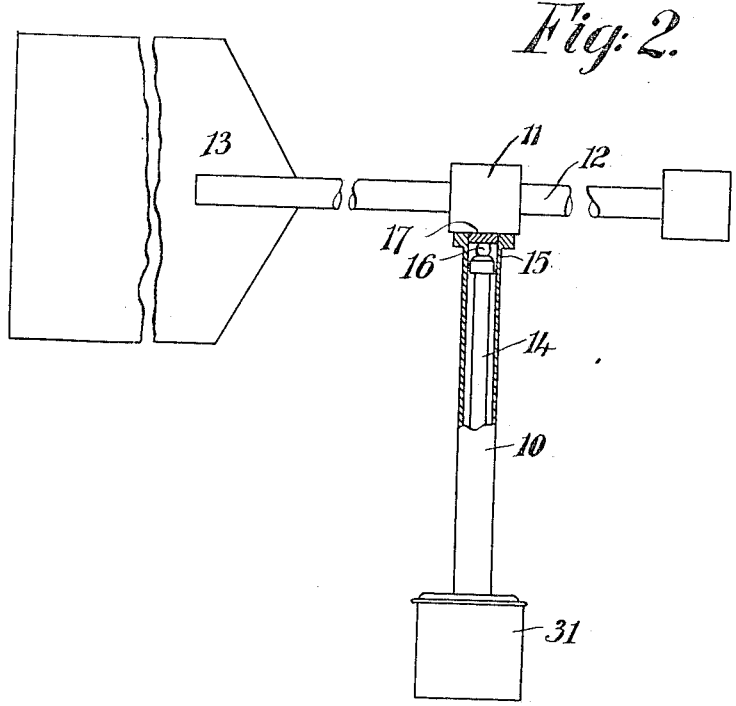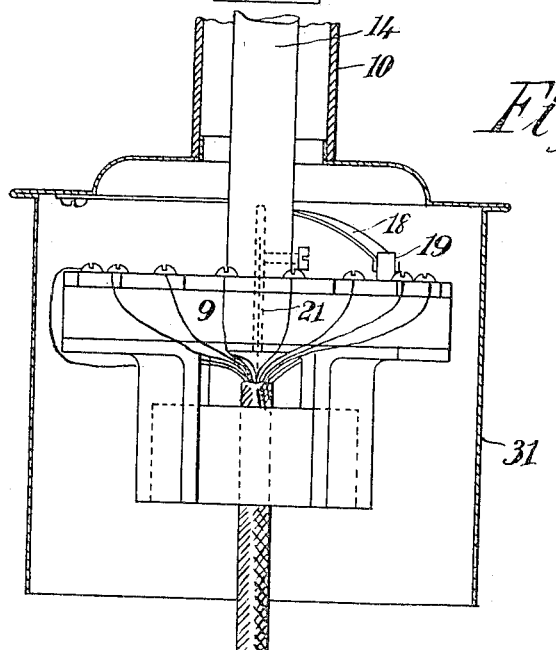

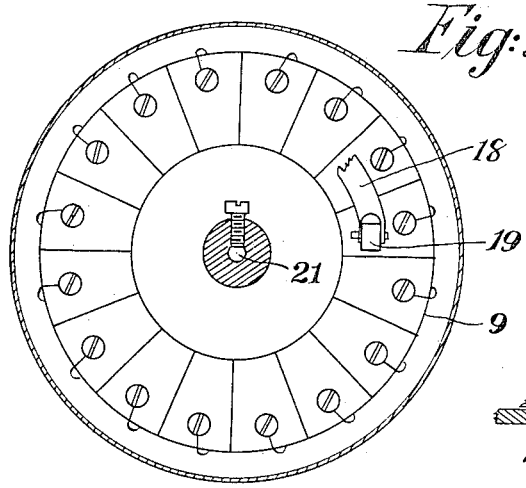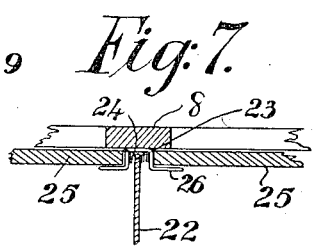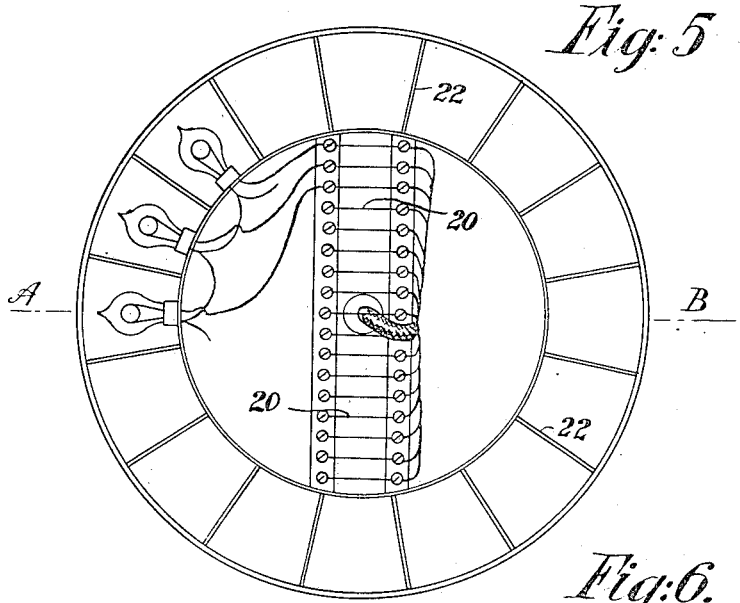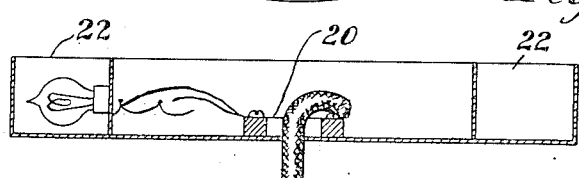

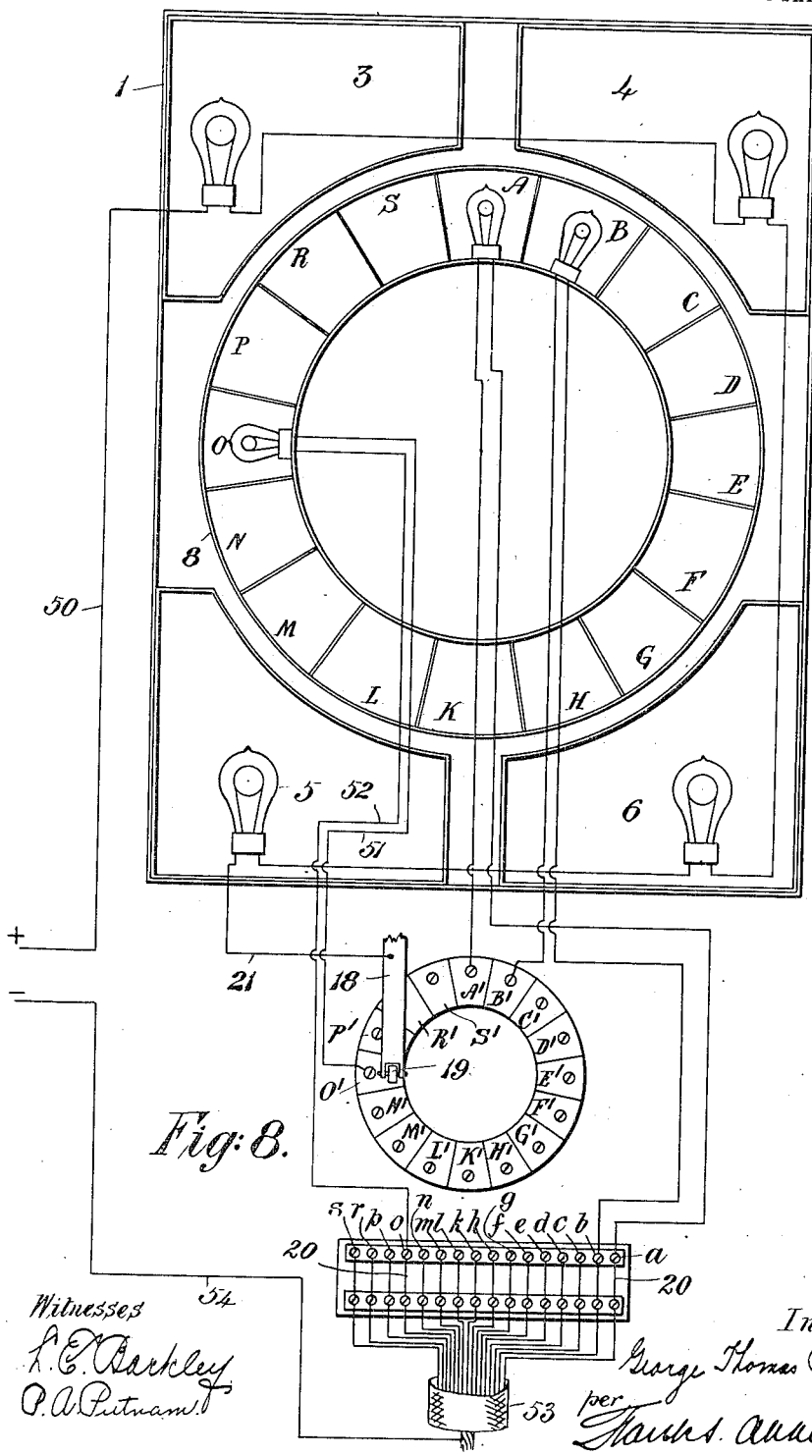

UNITED STATES PATENT OFFICE.

GEORGE THOMAS RICHARDSON, OF LONDON, ENGLAND.

APPARATUS FOR INDICATING THE DIRECTION OF THE WIND.

1,117,907.  Specification of Letters Patent.  Patented Nov. 17, 1914.

Application filed December 15, 1911. Serial No. 665,964.

*To all whom it may concern:*

Be it known that I, GEORGE THOMAS RICHARDSON, a subject of the King of Great Britain, residing at 18 Brownlow street, London, W. C., England, have invented a new and useful Improved Apparatus for Indicating the Direction of the Wind, of which the following is specification.

My invention relates to an improved apparatus for indicating the direction of the wind by means of a vane of any usual or convenient construction connected to apparatus for indicating by means of an electrically illuminated dial the precise direction of the wind from moment to moment.

My invention is illustrated in the accompanying drawings in which—

Figure 1 shows in front elevation the indicating dial, dial plate and casing. Fig. 2 shows a vane suitable for the purpose in view. Fig. 3 shows on an enlarged scale and in sectional elevation the commutator device and the connecting cable from the commutator strips to the lamps in the dial sections. Fig. 4 shows a sectional plan view of the apparatus illustrated in Fig. 3. Fig. 5 is a diagram of the dial divisions showing the wiring for the electric lamps. Fig. 6 is a horizontal section through Fig. 5 on the line A—B. Fig. 7 shows a detail of the construction of the dial, and Fig. 8 is a diagram of connections.

Referring first to Fig. 1, the dial plate is incased in a wooden or other suitable casing 1 preferably in the manner shown, in which the spaces 2, 3, 4, 5, 6 are available for ornament or for advertising purposes. The dial comprises the central part 7, preferably decorated with an ornamental pattern as shown in the drawing, and the sixteen peripheral divisions 8 inscribed with the points of the compass. These compass points are preferably indicated by perforated or cut out lettering in metal, and are divided one from another light-tight in the manner hereinafter more fully set forth. The front of the dial is glazed to prevent the access of dust. Within the casing 31 is fixed the stationary commutator 9 (shown in sectional elevation in Fig. 3 and in plan view in Fig. 4) around which the casing can revolve. Above the commutator is the vertical column 10 having attached to it at its upper end the head piece 11, through which passes the horizontal bar 12 connected to the wind vane 13. Underneath the head 11 is placed the central support 14 which passes downward through the hollow pillar 10 and the commutator 9 and is supported below in any convenient manner such as by means of an internally screw threaded collar supported by the brackets supporting the commutator (Fig. 3). At the top of the part 14 is placed a steel cup 15 and ball 16 upon which rests the plate 17 which supports the vanes and the column. By this construction the minimum frictional resistance is opposed to the turning of the column by the action of the wind on the vane 13. There is connected to the cover 31 the spring arm 18 with contact roller 19 which makes electric contact by means of the contact strips 20 (Fig. 5) with one wire of a lamp placed in one of the compartments of the dial. There are sixteen contact strips in the commutator, each connected to its respective lamp, and a central return wire 21 insulated and conducted centrally through the strand cable into which all the respective wires of the circuit are combined.

A further advantage of my apparatus is that by inserting the lamps which serve to illuminate the compartments 3, 4, 5, 6, in series in the general circuit I make use of them as resistances, and am thus enabled to use low voltage lamps in the dial compartments and take current from the ordinary electric supply, dispensing with the use of a separate battery or accumulator, which is expensive and needs periodical renewal. For instance in the construction shown in the drawings, assuming a 200 volt service, I may employ in each of the compartments 3, 4, 5, 6 a 50 volt lamp and in each indicator compartment, a 4 volt lamp. In this case each of the former lamps will consume 49 volts, and the dial lamp 4 volts.

The compartments of the dial are insulated light-tight from one another in the manner shown in Fig. 7. Each compartment 22 is provided with a strip of dark soft material such as velvet along its upper edge 23 over which there is a velvet or other strip 24 insuring that each compartment is absolutely light-tight with regard to the adjacent ones.

The glass covers of the dial compartments shown in section at 25 (Fig. 7) are supported by bent metal plates 26 as shown.

The operation of the apparatus is as follows: The motion of the vane turns the column 10 and casing 31 mounted thereon and this moves the arm 18 fixed to the casing, establishing the electric circuit through one or other of the lamp connections on the commutator. The current accordingly flows through the circuit including the lamps serving as resistances and the respective lamp and illuminates that dial section which indicates the precise direction of the wind. If the wind changes to the extent of a single point or more, the motion of the vane instantly changes the indication on the dial to the corresponding compartment, and thus even variable winds are continuously and certainly visibly indicated by the instant appearance of the illuminated corresponding sign.

The precise circuits may be traced in Fig. 8, which is extremely diagrammatic, for example, the casing 1 is shown diagrammatically in elevation, while the commutator and bars carrying the wires 20 are shown diagrammatically in plan. The wires between each segment A' B' C' ... of the commutator to the lamps A B C ..., and between the lamps and the terminals $a\ b\ c\ ...$ are not shown in detail. Samples are shown connecting up the three segments A' B' O' with the three lamps A B O, and the three terminals $a\ b\ o$. The remaining segments, lamps and terminals are connected up similarly, that is to say, from any segment one wire passes to the lamp bearing the corresponding reference character, and a second wire passes from that lamp to the terminal with the corresponding reference character. It will be seen as follows that the lamps in the compartments 3, 4, 5, 6 are always illuminated from the mains in series with one of the lamps A B C, which corresponds to the direction of the wind at any particular instant. Taking as an example the position shown in the diagram Fig. 8 when the roller 19 carried by the moving arm 18 is in contact with the commutator segment O' the circuit is as follows:—from the positive main through wire 50, through the lamp in compartment 3, the lamp in compartment 4, the lamp in compartment 5, through the return wire 21, which in reality is embodied in the cable containing all the wires from the bars carrying the wires 20; thence the circuit passes through arm 18, roller 19, commutator segment O', wire 51, lamp O, wire 52, terminal $o$, connecting wire 20, through the cable 53 by the return wire 54 to the negative main. When the roller 19 moves on to another segment it is obvious that a similar circuit will be closed, the only difference being that instead of the lamp O another lamp around the dial will be illuminated in accordance with the segment upon which the roller 19 rests.

The apparatus may of course be combined with a recording device for marking permanently each change in the direction of the wind. Such devices are assumed to be well known and are therefore not further described here.

The apparatus is simple, automatic in action, possesses few parts exposed to wear and can be conveniently read by any person on viewing the dial.

What I claim is:

In a wind indicator and advertising device, the combination of illuminated indications each representing a point of the compass, and additional illuminated signs; a lamp for illuminating each of said indications, lamps illuminating said additional illuminated signs, electric supply mains, a wind vane and a circuit maker operated by said wind vane to connect the lamps illuminating the additional signs permanently across said supply mains in series with the one lamp illuminating that indication of the point of the compass to which said wind vane is pointing.

In testimony whereof I have signed my name to this specification in the presence of two subscribing witnesses.

GEORGE THOMAS RICHARDSON.

Witnesses:
F. T. READ,
L. COPE.